United States Patent [19]
Stirling

[11] Patent Number: 5,306,342
[45] Date of Patent: Apr. 26, 1994

[54] PRODUCTION OF PIGMENTS

[75] Inventor: John A. Stirling, Glasgow, Scotland

[73] Assignee: Ciba-Geigy Corporation, Ardsley, N.Y.

[21] Appl. No.: 40,232

[22] Filed: Mar. 30, 1993

Related U.S. Application Data

[63] Continuation-in-part of Ser. No. 893,131, Jun. 3, 1992, abandoned.

[30] Foreign Application Priority Data

Jun. 6, 1991 [GB] United Kingdom ................. 9112155

[51] Int. Cl.⁵ ............................................. C09B 35/12
[52] U.S. Cl. ..................................... 106/494; 106/493; 106/496; 106/500; 106/504; 106/20 R; 106/23 H
[58] Field of Search ............... 106/494, 493, 500, 504, 106/496, 20 R, 23 H

[56] References Cited

U.S. PATENT DOCUMENTS

| 4,469,515 | 8/1984 | Pechey et al. | 106/23 |
| 4,885,033 | 12/1989 | Blackburn et al. | 106/494 |

FOREIGN PATENT DOCUMENTS

| 029009 | 5/1981 | European Pat. Off. |
| WO8910385 | 11/1989 | PCT Int'l Appl. |
| 1356253 | 6/1974 | United Kingdom |
| 1356254 | 6/1974 | United Kingdom |

*Primary Examiner*—Mark L. Bell
*Assistant Examiner*—Scott L. Hertzog
*Attorney, Agent, or Firm*—George R. Dohmann

[57] ABSTRACT

Process for the production of a flocculation-resistant pigment, comprising after-treating an arylamide pigment which has been subjected to a dyestuff treatment, the after-treatment comprising a further treatment of the dyestuff-treated arylamide pigment with an arylamide yellow dyestuff, under alkaline conditions at elevated temperature.

26 Claims, No Drawings

PRODUCTION OF PIGMENTS

This is a continuation-in-part of application Ser. No. 07/893,131, filed Jun. 3, 1992, now abandoned.

The present invention relates to the production of pigments.

Printing inks, e.g. liquid packaging inks, are based on a binder, e.g. nitrocellulose dissolved in a solvent. The two main solvents used are ethyl acetate, or a mixture of ethyl acetate and ethanol.

Many conventional pigments are stable to flocculation in inks containing ethyl acetate/alcohol solvent, but flocculate badly in inks based on ethyl acetate.

There is a need in the pigment industry, therefore, for pigments which are stable to flocculation in inks irrespective of whether the ink contains ethyl acetate or ethyl acetate/ethanol, as solvents.

The present invention provides a process for the production of flocculation resistant pigments comprising after-treating an arylamide pigment, which has been subjected to a dyestuff treatment, the after-treatment comprising a further treatment of the dyestuff-treated arylamide pigment with an arylamide yellow dyestuff under alkaline conditions at elevated temperature.

The dyestuff-treated arylamide pigments which are to be subjected to the after-treatment of the present invention are well-known commercial materials. Their production is described, inter alia, in GB 1356253 and GB 1356254.

Examples of the base arylamide pigments are diarylide yellow pigments obtained by coupling 3,3¹-dichlorobenzidine (DCB), tetrachlorobenzidine or 3,3¹-dimethoxybenzidine, with acetoacetanilide or a derivative thereof. Specific examples of such diarylide yellow pigments are Pigment Yellow 12 (DCB coupled with acetoacetanilide); Pigment Yellow 13 (DCB coupled with acetoacet-m-xylidide); Pigment Yellow 14 (DCB coupled with acetoacet-o-toluidide); Pigment Yellow 17 (DCB coupled with acetoacet-o-anisidide); Pigment Yellow 55 (DCB coupled with acetoacet-p-toluidide); and Pigment Yellow 83 (DCB coupled with acetoacet-2:5-dimethoxy-4-chloroanilide). Of these, Pigment Yellow 13 is the preferred arylamide pigment, when dyestuff-treated, for use in the process of the present invention.

The dyestuff treatment of the base arylamide pigment is a well-known technique which is described in GB 1356253. Thus 1-25%, preferably 1-10% by weight of a water-soluble azo dyestuff, based on the weight of pigment, is incorporated into the base arylamide pigment. As described in GB 1356253, the incorporation of the azo dyestuff may be effected by any of a number of procedures.

In one method, a stoichiometric excess of a coupling component precursor, which is common to both the pigment base and the additive, may be used, relative to the amount of the pigment tetrazo component precursor, e.g. DCB; and a minor proportion of a tetrazotised sulphonated benzidine or tetrazotised carboxylayed benzidine dye precursor, may be added a) to the said pigment tetrazo component precursor, prior to the coupling reaction; b) to a portion of the common coupling component precursor before the coupling reaction or c) to the coupling reaction mixture during or after the coupling reaction.

In another method, a stoichiometric excess of a tetrazo component precursor, which is common to both the pigment base and the dye additive, may be used, relative to the amount of the pigment coupling component; and a minor proportion of one or more dye coupling component precursors containing water-solubilizing groups, e.g. acetoacetanilide-4-sulphonic acid.

A further mode of effecting the initial dyestuff-treatment of the base pigment is by adding one or more water-soluble azo dyestuffs to the tetrazotised base pigment precursor, before the base pigment is produced by coupling; or to a portion of the base coupling component precursor, prior to the coupling; or to the reaction mixture used to produce the base pigment, during or after the coupling; or to the previously-prepared base pigment. A further possibility is to conduct the coupling reaction to produce the base pigment in a solution containing the previously-prepared water-soluble azo dyestuff.

In such cases, the coupling component used to produce the water-soluble dyestuff may be the same as, or different from that used to produce the base pigment. Likewise, the respective tetrazo components used to prepare the water-soluble dyestuff may the same as, or different from that used for the production of the base pigment.

The water-soluble azo dyestuff which is used to initially treat the base pigment is prepared by coupling a) a tetrazo component containing one or more water-solublilizing groups with a coupling component which is free from water-solubilizing groups; b) a tetrazo component which is free from water-solubilizing groups with a coupling component containing one or more water-solubilizing groups; or c) a tetrazo component and a coupling component each of which contains one or more water-solubilizing groups. Examples of such water-solubilizing groups are sulphonic acid groups and carboxylic acid groups and their water-soluble metal salts, especially alkali metal and alkaline earth metal salts, and ammonium salts; and amino groups or their salts with acids such as aliphatic acids. Coupling Method a) or b) is preferred.

Examples of tetrazo components which contain or or more water-solubilizing groups are those derived from diamines having the formula:

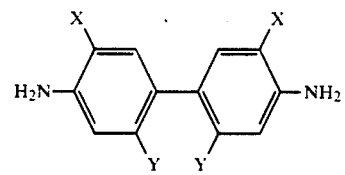

in which X and Y may be the same or different and each is hydrogen, methyl, $SO_3H$ or a metal or ammonium salt thereof, or $CO_2H$ or a metal or ammonium salt thereof, provided that at least one of X and Y is $SO_3H$, $CO_2H$ or a salt thereof. Specific examples of such amines are 2,2¹-disulpho-benzidine and its mono-calcium, mono-barium- and di-sodium salts; 2,2¹-disulpho-3,3¹-dimethylbenzidine and its di-sodium salt; and 2,2¹-di-carboxy-benzidine and its di-sodium salt.

Examples of coupling components which contain one or more water-solubilizing groups are acetoacetanilide-4-sulphonic acid and acetoacetanilide-4-carboxylic acid or their respective water-soluble salts, e.g. their sodium salts; and 4-amino-acetoacetanilide and its water-soluble salts e.g. its acetate salt.

Examples of tetrazo and coupling components which are free of water-solubilizing groups, are those which have been described herein before as precursors for the base pigment. 3,3¹-Dichlorobenzidine (DCB) is the preferred such tetrazo component.

The characterizing feature of the process of the present invention is the further (after-treatment) of the dyestuff-treated pigment with an arylamide yellow dyestuff, under alkaline conditions at elevated temperature.

The arylamide yellow dyestuffs used in the process of the present invention are obtained by coupling a) a diazo component containing one or more water-solubilizing groups, with a coupling component which is free of water-solubilizing groups, b) a diazo component which is free from water-solubilizing groups with a coupling component containing one or more water-solubilizing groups, or c) a diazo component and a coupling component, each of which contains one or more water-solubilizing groups. Methods a) and b) are preferred, especially method a).

Examples of such water-solubilizing groups are the same as those listed hereinbefore in relation to the initial dyestuff-treatment of the base pigment.

Examples of diazo components containing one or more water-solubilizing groups are those derived from aniline derivatives containing one or two water-solubilizing groups selected from sulphonic acid, carboxylic acid and further amino groups and their respective water-soluble salts and optionally one or more non-water solubilizing groups such as $C_1$–$C_4$ alkyl, $C_1$–$C_4$ alkoxy, chloro or nitro groups. Specific examples of such aniline derivatives include, aniline, an aniline mono-sulphonic acid, an aniline mono-carboxylic acid, aniline-2,5-disulphonic acid, 2-nitroaniline-4-sulphonic acid and 2-amino-5-methylbenzene sulphonic acid, or their respective water-soluble salts.

Examples of coupling components containing one or more water-solubilizing groups are acetoacetanilide-4-sulphonic acid and its sodium salt, acetoacetanilide-4-carboxylic acid and its sodium salt and 4-aminoacetoacetanilide and its acetate salt.

Examples of diazo components and coupling components which are free of further water-solubilizing groups are aniline and acetoacetanilide, acetoacet-o-toluidide, acetoacet-p-toluidide, acetoacet-o-anisidie, acetoacet-o-chloroanilide, acetoacet-2,4-xylidide and acetoacet-2,5-dimethoxy-4-chloroanilide.

The preferred arylamide yellow dyestuff for use in the process of the present invention is Pigment Yellow 62 (2-nitro-aniline-4-sulphonic acid coupled on to acetoacet-o-toluidide).

The amount of the arylamide yellow dyestuff which is used to after-treat the dyestuff-treated pigment is usually within the range of from 1 to 20%, preferably from 1 to 10% by weight, based on the weight of the dyestuff-treated pigment starting material.

The after-treatment with the arylamide yellow dyestuff is conducted at an alkaline pH and at elevated temperature. The pH value of the reaction mixture, during the after-treatment of the dyestuff-treated pigment with the arylamide yellow dyestuff, preferably ranges from 7 to 12, especially from 9 to 11. The temperature of the reaction mixture during the after-treatment preferably ranges from 50° C. to the boiling point of the reaction mixture at atmospheric pressure, more especially 50° C. to 100° C. The length of time during which the after-treatment is conducted preferably ranges from 20 minutes up to 5 hours, a period ranging from 30 minutes up to 2 hours being preferred.

Preferably, the after-treatment with the arylamide yellow dyestuff is combined with a conventional solvent treatment and with a conventional rosin treatment. These solvent and rosin treatments may also have been applied to the dyestuff-treated pigment starting material, prior to the after-treatment with the arylamide yellow dyestuff.

The solvent treatment procedure comprises treating an aqueous paste or aqueous suspension of the dyestuff-treatment pigment with a water-insoluble organic solvent. Preferably, the aqueous pigment paste or suspension is boiled with the solvent, and then the pigment is filtered off. Examples of such solvents include aromatic hydrocarbons, chlorinated hydrocarbons, esters, ethers, nitro compounds, nitriles and heterocyclic compounds, specific examples being tetralin, dibenzyl ether, o-dichlorobenzene, and dibutyl sebacate. Such solvent treatment imparts improved heat stability and flow properties to the treated pigment.

The rosination procedure comprises contacting an aqueous paste or aqueous suspension of the dyestuff-treated pigment with rosin or rosin derivative. Examples of such rosins are abietic acid and modified phenolic resins, resulting in pigments having improved flow properties.

If desired, the arylamide yellow dyestuff may be rendered insoluble, after it has been incorporated into the dyestuff-treated pigment by formation of an insoluble salt of a metal of Group IB, IIA, IIB, IIIA, IIIB or VIII of the Periodic Table of Elements. For example, the sodium salt of the arylamide yellow dyestuff component in the pigment may be contacted with a water-soluble salt of one of the specified metals at an alkaline pH. Suitable metal salts include zinc sulphate, barium chloride and calcium chloride.

The following Examples further illustrate the present invention.

EXAMPLE 1

The following solutions are prepared:

Solution 1:22.6 parts of 3,3¹-dichlorobenzidine are tetrazotised in 450 parts of water at 0° C.

Solution 2:1.1 parts of 4,4¹-diamino biphenyl,-2,2¹-disulphonic acid are tetrazotised in 100 parts of water at 0° C.

Solution 3:40 parts of 2,4-dimethyl acetoacetanilide are dissolved in a solution of 9.7 parts sodium hydroxide in 380 parts of water at 10° C.

Solution 4: 19.0 parts of acetic acid and 5.4 parts of hydrochloric acid are dissolved in 380 parts of water in a coupling vessel.

Solution 3 is added, dropwise, with good stirring, to solution 4 over 30 minutes, so that the pH at the end of the addition is slightly acidic.

Solution 1 is then added to the precipitated coupling component over at least 1 hour, so that no excess of tetrazo can be detected at any time, and the pH of the mixture is controlled throughout at 4.3 by addition of 10% sodium hydroxide solution.

Solution 2 is then added over 15 minutes showing no substantial quantity of excess tetrazo.

When coupling is complete, the following mixtures are prepared to effect an after-treatment.

Mixture A: 3.4 parts of dibutyl sebacate are emulsified in 50 parts water containing 0.34 parts of an ethoxylated nonyl phenol, as emulsifying agent.

Mixture B: 1.5 parts C.I. Pigment Yellow 62 are slurried in 10 parts of water to form a smooth paste.

Mixture C: 11.0 parts of a modified disproportionated rosin (Burez 9/18 ex Tenneco Chemicals) is dissolved in 3 parts of sodium hydroxide in 150 parts of water.

The after-treatment is carried out as follows:

The pH of the pigment slurry is raised to 10 with 10% sodium hydroxide solution, when mixture A and mixture B are added. The contents of the vessel are steam-heated to 95° C. and held for 1 hour. Mixture C is then added, and after 5 minutes stirring, the pH is lowered to 5 by addition of 10% hydrochloric acid solution.

The pigment composition so formed is filtered, washed substantially free of soluble salts with water and dried at 70° C.

The pigment composition so produced exhibits excellent flocculation stabilities in printing inks based on either ester/nitrocellulose or alcohol-rich/nitrocellulose solvent/binder systems.

EXAMPLES 2 and 3

The procedure set out in Example 1 is repeated except that there is used, instead of solution 1, a solution of tetrachlorobenzidine or 3,3¹-dimethoxybenzidine.

The after-treated pigment so obtained has properties similar to those of the product of Example 1.

EXAMPLES 4 and 5

The procedure outlined in Example 1 is repeated except that there is used, instead of solution 2, a solution of 2,2¹-disulpho-3,3¹-dimethylbenzide or 2,2¹-dicarboxybenzidine, respectively.

The after-heated pigment so obtained has properties in inks similar to those of the product of Example 1.

EXAMPLES 6 to 11

The procedure described in Example 1 is repeated except that there is used, instead of solution 3, a solution of aceto-acetanilide, acetoacet-o-toluidide, acetoacet-p-toluidide, acetoacet-o-chloroanilide, acetoacet-o-aniside or aceto-acet-2,5-dimethoxy-4-chloroanilide.

The product so produced has properties in inks similar to the properties of the product of Example 1.

EXAMPLE 12

The procedure described in Example 1 is repeated except that, instead of mixture B, there is used a slurry of 1.5 g of C.I. Pigment Yellow 61.

The after-treated pigment so obtained has properties in inks similar to those of the product of Example 1.

EXAMPLE 13

Solution 1: 35.7 parts of 3,3'-dichlorobenzidine and 1.7 parts of 4,4'-diaminobiphenyl-2,2'-disulphonic acid are tetrazotised in 700 parts of water at 0° C.

Solution 2: 62 parts of 2,4-dimethyl acetoacetanilide are dissolved in a solution of 15 parts of sodium hydroxide in 500 parts water at 10° C.

Solution 3: 26.5 parts of acetic acid and 8.3 parts of hydrochloric acid are dissolved in 500 parts of water in a coupling vessel.

Solution 2: is added, dropwise, with good stirring, to solution 3 over 30 minutes, so that the pH at the end of the addition is slightly acidic.

Solution 1 is then added to the coupling component over at least 1 hour, so that no excess of tetrazo can be detected at any time, and the pH of the mixture is controlled throughout, at around 4.3, by addition of 10% sodium hydroxide solution.

When the coupling is complete, the following mixtures are prepared to effect an after-treatment.

Mixture A: 5 parts of dibutyl sebacate are emulsified in 75 parts of water containing 0.5 parts of an ethoxylated nonyl phenol, as emulsifying agent.

Mixture B: 5 parts of the product obtained from the coupling of tetrazotised 4,4'-diaminobiphenyl,-2,2'-disulphonic acid with 2,4-dimethyl acetoacetanilide dissolved in 50 parts of 1% sodium hydroxide solution.

Mixture C: 22.5 parts of a modified disproportionated rosin (Burez 9/18 ex Tenneco Chemicals) are dissolved in 6 parts of sodium hydroxide in 250 parts of water.

The after-treatment is carried out as follows:

The pH of the pigment slurry is rendered alkaline with 10% sodium hydroxide and mixtures A and B are added. The resultant mixture is heated to 95° C. and held for 1 hour. Mixture C is then added and, after 5 minutes stirring, the pH is lowered to 5 with 10% hydrochloric acid solution.

The pigment composition so formed is filtered, washed substantially free of soluble salts with water and dried at 70° C.

The resultant pigment composition exhibits excellent flocculation stability in both ester and alcohol rich nitrocellulose ink systems.

EXAMPLES 14 to 16

The procedure set out in Example 13 is repeated except that there is used, instead of mixture B, a mixture of the product from diazotised 3-nitro, 4-amino benzene sulphonic acid coupled with acetoacetanilide, or with 2,4-dimethyl acetoacetanilide, or with 2-methyl, acetoacetanilide, respectively.

These products have the same excellent flow properties as described for those of Example 1.

EXAMPLES 17 to 19

Mixture B in Example 13 is replaced by the product from 3,3'-dichlorobenzidine coupled with acetoacetanilide, 4-sulphonic acid or the product from 2,2'-disulpho benzidine coupled with acetoacetanilide, 4-sulphonic acid, or the product from 2,5-disulpho, aniline coupled with 2,4-dimethyl acetoacetanilide, respectively. Products having excellent flow are obtained.

I claim:

1. Process for the production of a flocculation-resistant pigment, comprising after-treating an arylamide pigment which has been subjected to a dyestuff treatment, the after-treatment comprising a further treatment of the dyestuff-treated arylamide pigment with an arylamide yellow dyestuff, under alkaline conditions at elevated temperature.

2. Process according to claim 1 in which the arylamide pigment is a diarylide yellow pigment, or an arylamide yellow pigment.

3. Process according to claim 2 in which the arylamide pigment is a diarylide yellow pigment produced by coupling 3,3¹-dichlorobenzidine, tetrachlorbenzidine or 3,3¹-dimethoxybenzidine with acetoacetanilide or a derivative thereof.

4. Process according to claim 3 in which the diarylide yellow pigment is Pigment Yellow 12, Pigment Yellow 13, Pigment Yellow 14, Pigment Yellow 17, Pigment Yellow 55, or Pigment Yellow 83.

5. Process according to claim 1 in which the arylamide pigment has been treated with 1 to 25% by weight, based on the weight of pigment, of a water-soluble azo dyestuff.

6. Process according to claim 5 in which the water-soluble azo dyestuff is prepared by coupling a tetrazo component containing one or more water-solubilizing groups, with a coupling component which is free from water-solubilizing groups.

7. Process according to claim 6 in which the tetrazo component is derived from a diamine having the formula:

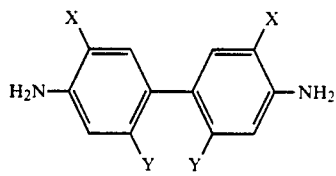

in which X and Y are the same or different and each is hydrogen, methyl, $SO_3H$ or a metal or ammonium salt thereof, or $CO_2H$ or a metal or ammonium salt thereof, provided that at least one of X and Y is $SO_3H$, $CO_2H$ or a metal or ammonium salt thereof.

8. Process according to claim 7 in which the tetrazo component is derived from 2,2¹-disulphobenzidine; 2,2¹-disulpho-3,3¹-dimethylbenzidine; or 2,2¹-dicarboxybenzidine or their mono-calcium, mono-barium, or di-sodium salts.

9. Process according to claim 5 in which the water-soluble azo dyestuff is prepared by coupling a tetrazo component which is free from water-solubilizing groups with a coupling component containing one or more water-solubilizing groups.

10. Process according to claim 9 in which the tetrazo component is 3,3¹-dichlorobenzidine.

11. Process according to claim 9 in which the coupling component containing one or more water-solubilizing groups is acetoacetanilide-4-sulphonic acid or acetoacetanilide-4-carboxylic acid or their respective water-soluble salts; or 4-amino-acetanilide or its water-soluble salts.

12. Process according to claim 1 in which the arylamide yellow dyestuff is obtained by coupling a diazo component containing one or more water-solubilizing groups, with a coupling component which is free of water-solubilizing groups.

13. Process according to claim 12 in which the diazo component is an aniline derivative containing one or two water-solubilizing groups selected from sulphonic acid, carboxylic acid and further amino groups and their respective water-soluble salts and, optionally, one or more non-water-solubilizing groups.

14. Process according to claim 13 in which the non-water-solubilizing groups are selected from $C_1$-$C_4$ alkyl, $C_1$-$C_4$ alkoxy, chloro and nitro groups.

15. Process according to claim 12 in which the diazo component is aniline, an aniline mono-sulphonic acid, an aniline mono-carboxylic acid, aniline-2,5-disulphonic acid, 2-nitroaniline-4-sulphonic acid, 2-amino-5-methylbenzene sulphonic acid, or their respective water-soluble salts.

16. Process according to claim 6 in which the coupling component is acetoacetanilide, acetoacet-o-toluidide, acetoacet-p-toluidide, acetoacet-o-aniside, acetoacet-o-chloranilide, acetoacet-2,4-xylidide or acetoacet-2,5-dimethoxy-4-chloranilide.

17. A process according to claim 12 in which the coupling omponent is acetoacetanilide, acetoacet-o-toluidide, acetoacet-p-toluidide, acetoacet-o-aniside, acetoacet-o-chloranilide, acetoacet-2,4-xylidide or acetoacet-2,5-dimethoxy-4-chloranilide.

18. Process according to claim 1 in which the amount of arylamide yellow dyestuff used to after-treat the dyestuff-treated pigment ranges from 1 to 20% by weight, based on the weight of the dyestuff-treated pigment.

19. Process according to claim 1 in which the after-treatment with the arylamide yellow dyestuff is conducted at a pH ranging from 7 to 12.

20. Process according to claim 1 in which the after-treatment with the arylamide yellow dyestuff is conducted in combination with a solvent treatment and a rosin treatment.

21. Process according to claim 20 in which the solvent used is an aromatic hydrocarbon, a chlorinated hydrocarbon, an ester, an ether, a nitro compound, a nitrile or a heterocyclic compound.

22. Process according to claim 21 in which the solvent is tetralin, dibenzyl ether, o-dichlorobenzene or dibutyl phthalate.

23. Process according to claim 20 in which the rosin is abietic acid or a modified phenol.

24. Process according to claim 1 in which the arylamide yellow dyestuff, after use in the after-treatment of the dyestuff-treated pigment, is rendered insoluble by conversion into an insoluble salt of a metal of Group IB, IIA, IIB, IIIA, IIIB or VIII of the Periodic Table of Elements.

25. Printing ink comprising a flocculation-resistant pigment produced by a process claimed in claim 1.

26. Printing ink according to claim 25 which is a liquid packaging ink, based on nitrocellulose binder and ethyl acetate or ethyl acetate/ethanol solvent, comprising a pigment produced by a process claimed in claim 1.

* * * * *